United States Patent [19]

Neel et al.

[11] Patent Number: 4,547,283
[45] Date of Patent: Oct. 15, 1985

[54] PROCESS FOR THE HYDROISOMERIZATION OF PETROLEUM WAXES

[75] Inventors: Emmanuel E. A. Neel; Jacques A. Levavasseur; Jacques P. Lucien, all of Grand-Couronne, France

[73] Assignee: Shell Oil Company, Houston, Tex.

[21] Appl. No.: 646,278

[22] Filed: Aug. 30, 1984

[30] Foreign Application Priority Data

Oct. 14, 1983 [FR] France .............................. 83 16372

[51] Int. Cl.$^4$ ............................................ C10G 49/02
[52] U.S. Cl. .................................... 208/46; 502/232; 502/242; 502/250; 502/263; 585/734
[58] Field of Search .................. 208/46, 27, 143, 144; 585/253, 734

[56] References Cited

U.S. PATENT DOCUMENTS

| | | | |
|---|---|---|---|
| 2,668,866 | 2/1954 | Good et al. | 208/46 |
| 3,285,845 | 11/1966 | Demeester | 208/27 |
| 3,658,689 | 4/1972 | Steinmetz et al. | 208/96 |
| 4,139,494 | 2/1979 | Itoh et al. | 208/27 |
| 4,140,619 | 2/1979 | van der Wiel et al. | 208/27 |
| 4,147,613 | 9/1979 | Gladrow | 208/46 |
| 4,186,078 | 1/1980 | Itoh et al. | 208/27 |
| 4,428,819 | 1/1984 | Shu et al. | 208/46 |

*Primary Examiner*—D. E. Gantz
*Assistant Examiner*—Anthony McFarlane
*Attorney, Agent, or Firm*—Kimbley L. Muller

[57] ABSTRACT

Process for the hydroisomerization of petroleum waxes by contacting said waxes with hydrogen at hydroisomerization conditions using a catalyst comprising at least one hydrogenating metal or compound thereof present on at least one refractory oxide which has been treated with from 0.1 to 30% w, calculated on refractory oxide, of at least one reactive metal compound of Group 2a, 3a, 4a and/or 4b of the Periodic Table of the Elements.

14 Claims, No Drawings

PROCESS FOR THE HYDROISOMERIZATION OF PETROLEUM WAXES

BACKGROUND OF THE INVENTION

This invention relates to a process for the hydroisomerization of petroleum waxes and to lubricating oils obtained therefrom.

It is known to hydrogenate petroleum waxes using catalysts comprising hydrogenating metals present on refractory oxide supports in order to increase the light- and thermal-stability of such waxes (West German patent application No. 2,644,519).

Although petroleum waxes can be converted into high or even extra high viscosity index lubricating oils, for which a high demand exits, considerable sacrifices have to be made with respect to the conversion rate of the petroleum waxes and unacceptably high reaction temperatures have to be used.

It has now surprisingly been found that these disadvantages can be avoided by treating refractory oxides with certain reactive metal compounds thus giving excellent catalysts for use in a process for the hydroisomerization of petroleum waxes.

SUMMARY OF THE INVENTION

The invention therefore relates to a process for the hydroisomerization of petroleum waxes, wherein said waxes are contacted with hydrogen at hydroisomerization conditions using a catalyst comprising at least one hydrogenating metal or compound thereof present on at least one refractory oxide which has been treated with from 0.1 to 30%w, calculated on refractory oxide, of at least one reactive metal compound of Group 2a, 3a, 4a and/or 4b of the Periodic Table of the Elements. Reference is made to the "Handbook of Chemistry and Physics", 55th edition, CRC Press, Ohio, USA (1975) for the Periodic Table of the Elements.

DETAILED DESCRIPTION OF THE INVENTION

In co-pending French patent application No. 8316373, filed on Oct. 14, 1983, a process is described and claimed for the preparation of modified refractory oxides and for their use as catalysts or catalyst supports in catalytic hydroconversion processes of hydrocarbons other than the hydroisomerization of petroleum waxes; such modified refractory oxides are preferred catalyst carriers for use in the process according to the present invention.

It appears that after treating refractory oxide particles with reactive metal compounds as defined hereinbefore, metal moieties are bound to a rather large extent to the surface of the particles in mono- and/or multi-molecular layers. This is quite distinct from the results obtained by using well-known methods for preparing hydroconversion catalysts such as co-precipitation or gel mixing of carrier components (e.g., silica and alumina); the latter catalysts appear to have metals (e.g., aluminum) or metal moieties throughout the body of the particles.

Without wishing to be bound to any particular theory, it is thought that the presence of metal moieties on the surface of catalyst support particles has an influence on their acidity, while maintaining and possibly improving their surface area and pore volume. For refractory oxides such as silica, which apparently lack sufficient acidity for application as catalyst support in a process for hydroisomerization of petroleum waxes where catalysts with moderate acidity are needed, treatment with reactive metal compounds provide a marked improvement in catalytic performance of such refractory oxides.

Substantially non-crystalline refractory oxide particles which have a specific surface area of 100-600 m$^2$/g are suitably used in the process according to the invention; preferred is a surface area of 200-500 m$^2$/g.

Refractory oxides which can be suitably used in the present process comprise silica, alumina, magnesia, zirconia, titania, chromia, boria or combination thereof such as silica-alumina, silica-magnesia, alumina-magnesia and/or silica-zirconia. Preference is given to silica, in particular to silica with a pore volume of at least 0.5 ml/g from which excellent catalyts for the hydroisomerization of petroleum waxes can be prepared.

Small amounts of water may be tolerated in the refractory oxides used as starting material to prepare catalysts applied in the present process. For instance, for silica-comprising particles this amount of water may be up to 12%w, calculated on total weight.

Refractory oxide particles treated for use as catalyst carrier in the process according to the process of the invention generally exhibit a good resistance against crushing which is advantageous when these particles are used in a catalyst bed which has a substantial height (which may be 15 m or more in an upright reactor) or when a second layer of catalyst particles is placed upon this catalyst bed. Generally the modified refractory oxide particles have a bulk crushing strength (BCS) of 1-4 Mpa and a side crushing strength (SCS) of more than 40N; preferably the BCS is 1.5-3 MPa and the SCS is 50-200N.

Catalyst beds are often covered at their inlet by materials which are inert to the reaction, in order to facilitate even distribution of the feedstock, that is, to prevent or reduce channelling through the catalyst bed(s). Because the inerts will occupy a substantial portion of the reaction zone, e.g., up to 15 or 20% or more of the reaction zone volume, their presence adds to the capital expenditure of a catalytic hydroisomerization process both for the reactor(s) and for the costs of the inerts which do not contribute in any significant manner to the desired conversion of the feedstock.

The presence of layers of inert material can be avoided in hydroisomerization reactors when the catalyst employed therein is also capable of distributing the feedstock over the catalyst bed(s). Catalysts containing treated refractory oxides prepared for use in the process according to the present invention, and in particular substantially spherical particles, are eminently suitable for this task.

The use of spherical particles, which moreover have a high abrasion strength, not only results in improved flow distribution of feedstock but also in a reduced pressure drop over the catalyst bed(s), compared with the use of treated particles of a different shape. The term "spherical" as used herein refers to particles having both a true rounded shape and those generally spheroidal particles which do not pass perfectly rounded configurations.

Procedures for preparing these particles are known in the art. For instance, silica spheres can be prepared by a method comprising the initial preparation of a silica hydrogel by mixing an aqueous solution of an alkali metal silicate with an aqueous solution of an acid, converting the hydrosol obtained into droplet form and gelling the droplets in a liquid which is not miscible with water. Optionally, the hydrogel obtained is then converted into a xerogel by drying and calcining, after reducing the alkali metal content of the spherical silica hydrogel particles.

Generally use is made of catalyst particles of which the smallest size is of from 0.1-30 mm. Beds of refractory oxide catalyst particles of less than 0.1 mm tend to plug more readily and are less effective in distributing feed across the initial contact layer of catalyst than beds of larger particles, whereas the use of particles of which the smallest size is above 30 mm results in catalysts having significantly lower activity per volume unit. Preferably use is made of catalyst particles of which the smallest size is of from 0.5-10 mm. When the particles used are spheres the term "smallest size" refers, of course, to their diameters. Otherwise, e.g., for dumbbell shaped particles, this term refers to the smallest distance from one wall to an opposite wall of the particle.

Refractory oxides can be suitably treated with reactive metal compounds either by impregnating the refractory oxides with a solution comprising hydrocarbyl ammonium metallate or with at least two solutions comprising, respectively, one or more metal compounds and a hydrocarbyl ammonium hydroxide. Preference is given to the use of a hydrocarbyl ammonium moiety comprising one or more alkyl-groups with 1-4 carbon atoms, most preferably a tetramethyl ammonium moiety.

Suitable reactive metal moieties comprise magnesium, aluminum, titanium and zirconium, which can be used separately or in combinations. When use is made of silica-comprising refractory oxides, aluminum is the preferred reactive metal moiety which is very suitably applied by impregnating the refractory oxide with a solution comprising tetramethyl ammonium aluminate. Other reactive metal moieties, such as zirconium and magnesium are preferably applied, like aluminum, to the refractory oxides by impregnation with a solution comprising the nitrate(s) of the reactive metal(s) and subsequently with a solution comprising at least one hydrocarbyl ammonium hydroxide, preferably in such manner that the weight ratio of the appropriate refractory oxide(s) to hydrocarbyl ammonium hydroxide is of from 1 to 100, preferably of from 2 to 10.

Also metal alkoxides such as titanium alkoxide (in particular titanium (IV) ethoxide) can be suitably applied to incorporate a reactive metal into the refractory oxide(s).

The impregnation of the refractory oxides may be carried out in one or more stages with one or more solutions by any method known in the art e.g., dipping, soaking ("wet") or "dry" impregnation, in which last method the volume of the impregnating solution used is about equal to the total pore volume of the refractory oxide particles to be impregnated. The impregnation treatment is suitably carried out at temperatures up to the boiling point of the solvent, preferably at temperatures of from 60°-90° C. using aqueous solutions.

The refractory oxides thus treated suitably contain from 0.1 to 10% w, and preferably 1-7%w, of reactive metals, calculated as metal oxides and based on refractory oxides. It is thought that larger amounts of reactive metals could adversely affect the strength of the treated refractory oxide particles thus obtained.

The treated refractory oxides are suitably subjected to a heat treatment after the (final) impregnation step or, alternatively, after more than one or after each impregnation step. The heat treatments comprise drying, suitably at temperatures of from 50°-250° C., and/or calcining steps, the latter being suitably carried out in air under atmospheric pressure at temperatures of from 250°-1000° C. With a two-step impregnation process, using for instance metal nitrates in the first step, it is preferred to calcine the metal-impregnated refractory oxides firstly at temperatures of from 250°-400° C. for 1-24 hours before carrying out the second impregnation step with hydrocarbyl ammonium hydroxide. After the second impregnation step the treated refractory oxides are preferably subjected to a calcination treatment in air at temperatures of from 400°-800° C. for 1-24 hours.

At least one hydrogenating metal or metal compound should be incorporated in the refractory oxides in any stage of their preparation in the above-described manner, preferably after a heat treatment. Preferred metal compounds are nitrates, oxides and/or sulfides. Of particular interest are catalytic composites comprising one or more metals of the groups 6b and/or 8 of the Periodic Table of the Elements, and/or compounds thereof, such as molybdenum, tungsten, chromium, iron, nickel, cobalt, platinum, palladium, ruthenium, rodium, osmium and iridium; the treated refractory oxides may be loaded with these metals or their compounds by means of any process for the preparation of catalysts known in the art, such as impregnation, ion-exchange or precipitation.

Preferred catalysts for use in the process of this invention (i.e., bifunctinal catalysts wherein acidity and hydrogenation activity have been balanced carefully) comprised treated refractory oxides which have been loaded with from 0.1 to 2% by weight of one or more noble metals of Group 8, in particular platinum, calculated on the weight of the treated refractory oxides.

Petroleum waxes contain normal and slightly branched paraffins of high molecular weight which solidify at ambient temperature. These waxes are usually obtained from the heavier fractions of crude oils, suitable as by-product during the preparation of lubricating oils. The wax obtained during the refining of various lubricating oil fractions is designated as distillate or residual slack wax, depending on the type of lubricating oil fraction from which it is derived by dewaxing.

The dewaxing treatment can be carried out in any manner known in the art, e.g. by means of a solvent. This latter process provides for dissolving a wax-containing feedstock in an organic solvent and gradually chilling this feedstock to cause crystallization of the wax, which is subsequently separated from the solvent/oil mixture by filtration. Suitable solvents for this treatment are liquified propane and butane, pentane, benzene, toluene, acetone, methyl ethyl ketone and mixtures of one or more aromatic compounds with methyl ethyl ketone. Dewaxing is peferably carried out using a mixture of 40-60 parts by volume of methyl ethyl ketone and 60-40 parts by volume of toluene at a temperature between −10° and −30° C., the volume ratio of the solvent and oil being between 1 and 10.

A preferred feed for the process according to the invention consists of slack waxes obtained as by-products in the preparation of lubricating oils by hydrocracking. From the lubricating oil fractions obtained by hydrocracking a heavy cut of hydrocarbons, such as a vacuum distillate, a deasphalted oil or a slack wax, lubricating oils are prepared by removing slack wax from these lubricating oil fractions. If desired this slack wax may be mixed with waxes obtained as by-product during conventional preparation of lubricating oils, before being applied as feed in the present process.

Slack waxes possess a very high viscosity index, normally in the range of from 140 to 200, depending i.a. on their oil content and on the starting material from which they have been prepared. They are therefore eminently suitable for the preparation of lubricating oils with (extra) high viscosity indices, i.e. between 130 and 200, which products may serve for use as multigrade lubricating oils or as components of multigrade lubricating oils.

Sulfur-containing compounds may be present in amounts of up to 100 ppmw in the slack waxes, without causing unacceptable loss of hydroisomerization activity, when using the above-described catalysts. Also small amounts of nitrogen-containing compounds may be tolerated.

A preferred catalyst for the hydroisomerization of petroleum waxes comprises platinum and/or palladium incorporated in silica spheres which have been impregnated with tetramethyl ammonium aluminate.

Prior to their use in hydroisomerization process according to the invention the catalysts are preferably activated by treatment with hydrogen at a temperature from 150° C. to 700° C., in particular for at least several hours at a temperature of from 300° C. to 500° C. and at least atmospheric pressure.

In general the reaction conditions applied in hydroisomerization processes comprise a temperature in the range of from 250° to 450° C., preferably of from 275° to 400° C.; a pressure in the range of from 10 to 250 bar, preferably of from 50 to 150 bar; a hydrogen feed ratio in the range from 100 to 2500 Nl/kg feed, preferably from 200 to 2000 Nl/kg feed; a space velocity in the range of from 0.1 to 5 kg feed/l catalyst/hour, preferably of from 0.5 to 4 kg feed/l catalyst/hour. A reaction temperature substantially exceeding 450° C. is less desirable as it might cause considerable shortening of the catalyst life by increased formation of carbonaceous deposits thereon.

The hydrogen to be employed in these catalytic hydroisomerization processes may be pure or in the form of hydrogen-containing gases. The gases employed should preferably contain more than 50% by volume of hydrogen. Very suitable are, for example, hydrogen-containing gases obtained in the catalytic reforming or steam-reforming of gasoline fractions, and mixtures of hydrogen and light hydrocarbons. Any excess of hydrogen-containing gas is advantageously recycled, possibly after the previous removal of undesired components therefrom.

The invention is illustrated by the following Examples.

EXAMPLE 1

Two platinum-containing catalysts were prepared as follows.

A. Silica spheres with a diameter of 1.5–2 mm, a pore volume of 0.74 ml/g and a specific surface area of 294 m$^2$/g were pre-dried at 200° C. for 3 hours. A quantity of 100 g of pre-dried silica spheres was impregnated with 388 ml of an aqueous solution comprising 39 g of tetramethyl ammonium aluminate at ambient temperature for 3 hours in a nitrogen atmosphere and subsequently kept in an autoclave for a further 16 hours at ambient temperature. The treated silica spheres were dried at 200° C. for 3 hours and subsequently calcined in air at 600° C. for 3 hours. The calcined spheres obtained contained 5.1%w aluminum, calculated as Al$_2$O$_3$ (based on the total weight of the spheres); the pore volume was 0.65 ml/g and the specific surface area 346 m$^2$/g. A quantity of 35 g of the calcined spheres was impregnated with a solution of 373 mg of H$_2$PtCl$_6$ and 2.4 ml of HCl (38%v) in 43 ml of water, after which water was evaporated at 60° C. and the product was dried at 150° C. and subsequently calcined in air at 500° C. for 2 hours. The resultant catalyst A contains 0.4% w of platinum, calculated on the weight of calcined, platinum-free spheres.

B. Preparation of a Comparative Catalyst

A quantity of 70 g of pre-dried silica spheres, with a pore volume of 0.64 ml/g and a specific surface area of 257 m$^2$/g was exchanged with a solution of 10.95 g of Pt(NH$_3$)$_4$(OH)$_2$ in 1 l water for 48 hours after which the product was washed with water, dried at 150° C. and subsequently calcined in air at 500° C. for 2 hours. The resultant catalyst B contains 0.9% by weight of platinum calculated on the weight of the pre-dried silica spheres.

EXAMPLE 2

Catalytic Hydroisomerization of Slack Wax

Catalysts A and B as described in Example 1 were evaluated on the basis of the results of experiments performed in trickle flow units. The slack wax feed to be hydroisomerized, which was entirely or substantially in the liquid phase, was trickled downwardly co-currently with the hydrogen-containing gas through the fixed catalyst beds. The units were equipped with 100 ml reactors operated in once-through mode and contained 25 g of catalyst particles diluted with 73 g of silicium carbide particles with a diameter of 0.2 mm.

Before being used for the catalytic hydroisomerization of slack wax, the catalysts A and B were activated by treatment with hydrogen in the hydroisomerization reactor at a temperature of 450° C., a pressure of 140 bar and a hydrogen feed rate of 1000 Nl/kg feed for 16 hours.

After this activation treatment the temperature of the reactor was adjusted to the level required to obtain 70%w conversion of the slack wax feed (further indicated as: Activity, T$_{70\%}$) with the use of, respectively, catalysts A and B. The slack wax used as feed contained 26%w oil, 2.3 ppmw of sulfur and <1 ppmw of nitrogen and was obtained as by-product during the preparation of extra high viscosity index lubricating oils. The results of the experiments are given in the Table hereinafter.

Further hydroisomerization reaction conditions were:

Total pressure: 140 bar; Space velocity: 2.0 kg of slack wax/l of catalyst/hour; Hydrogen/feed rate: 1000 Nl/kg feed.

The product stream was analyzed by means of low resolution NMR and gas/liquid chromatography.

"Selectivity, S$_{70\%}$" indicated in the Table below is defined as:

$$\text{oil selectivity} = \frac{\text{oil in product} - \text{oil in feed (\% w)}}{\text{wax in feed} - \text{wax in product (\% w)}} \times 100$$

TABLE

| Experiment No. | Catalyst | Activity, $T_{70\%}$(°C.) | Selectivity, $S_{70\%}$(% w) |
|---|---|---|---|
| 1 | A | 342 | 59 |
| 2 | B | >400 | * |

*Because of the inactivity below 400° C. of catalyst B the level of 70% w conversion of slack wax was not attained.

The viscosity indices of lubricating oils obtained by fractionating the product from Experiment No. 1 amounted to 154–156.

From the results given in the Table it is clear that catalyst A obtained by treatment of silica with tetramethyl ammonium aluminate is considerably more active than catalyst B which has been prepared in a conventional manner. Catalyst A also exhibits excellent selectivity for the preparation of high viscosity index lubricating oils.

What is claimed is:

1. A process for the hydroisomerization of petroleum waxes, wherein said waxes are contacted with hydrogen at isomerization conditions using a catalyst comprising at least one refractory oxide consisting of modified silica, wherein said silica has been treated with from 0.1 to 30 wt%, calculated on refractory oxide, of at least one reactive metal compound of Group 2a, 3a, 4a and 4b of the Periodic Table of Elements, wherein said silica is modified by (1) impregnating said silica with:
   i. a solution of a hydrocarbyl ammonium metallate; or
   ii. two solutions, wherein the first of said two solutions contains a hydrocarbyl ammonium hydroxide and the second of said two solutions contains said at least one reactive metal moiety or moieties selected from the group consisting of a moiety or moieties of said elements of Group 2a, 3a, 4a and 4b of the Periodic Table of Elements, and after said impregnation; (2) drying said modified silica at a temperature of from 50°–250° C.; (3) calcining said dried modified silica at a temperature of from 250°–1000° C; and (4) recovering the resultant modified silica for said hydroisomerization of said petroleum waxes.

2. The process according to claim 1 wherein said silica has a pore volume of at least 0.5 ml/g and a specific surface area of from 100 to 600 m²/g.

3. The process according to claim 1, wherein said silica has a size of from 0.1 to 30 mm.

4. The process according to claim 3, wherein said silica has a diameter of from 0.5 to 10 mm.

5. The process according to claim 3, wherein said silica is present as substantially spherical catalyst particles.

6. The process according to claim 1, wherein said silica contains from 0.1 to 10%w of said reactive metal(s), calculated as metal oxides and based on refractory oxide.

7. The process according to claim 6, wherein said silica is treated with reactive metal moieties selected from the group consisting of magnesium, aluminum, titanium and zirconium.

8. The process according to claim 6, wherein said silica is impregnated with a solution comprising the nitrate(s) of one or more of the reactive metal(s) and a solution comprising said hydrocarbyl ammonium hydroxide.

9. The process according to claim 8, wherein said hydrocarbyl ammonium hydroxide has a weight ratio of from 1 to 100 with respect to said silica.

10. The process according to claim 1, wherein said silica is impregnated with a solution of tetramethyl ammonium aluminate.

11. The process according to claim 1, wherein said silica is loaded with one or more hydrogenating metals of Groups 6b and 8 of the Periodic Table of the Elements or compounds thereof.

12. The process according to claim 11, wherein said silica is loaded with from 0.1 to 2%w of one or more noble metals of Group 8, calculated on the weight of the treated refractory oxides.

13. The process according to claim 1 wherein said hydroisomerization is carried out at a temperature in the range of from 250° to 450° C., a pressure in the range of from 10–250 bar, a space velocity in the range of from 0.1 to 5 kg feed/1 catalyst/hour and a hydrogen/-feed ratio in the range of from 100 to 2500 Nl H₂/kg feed.

14. The process according to claim 1 wherein said impregnating is carried out at temperatures of from 60°–90° C. using aqueous solutions.

* * * * *